Figure 1:
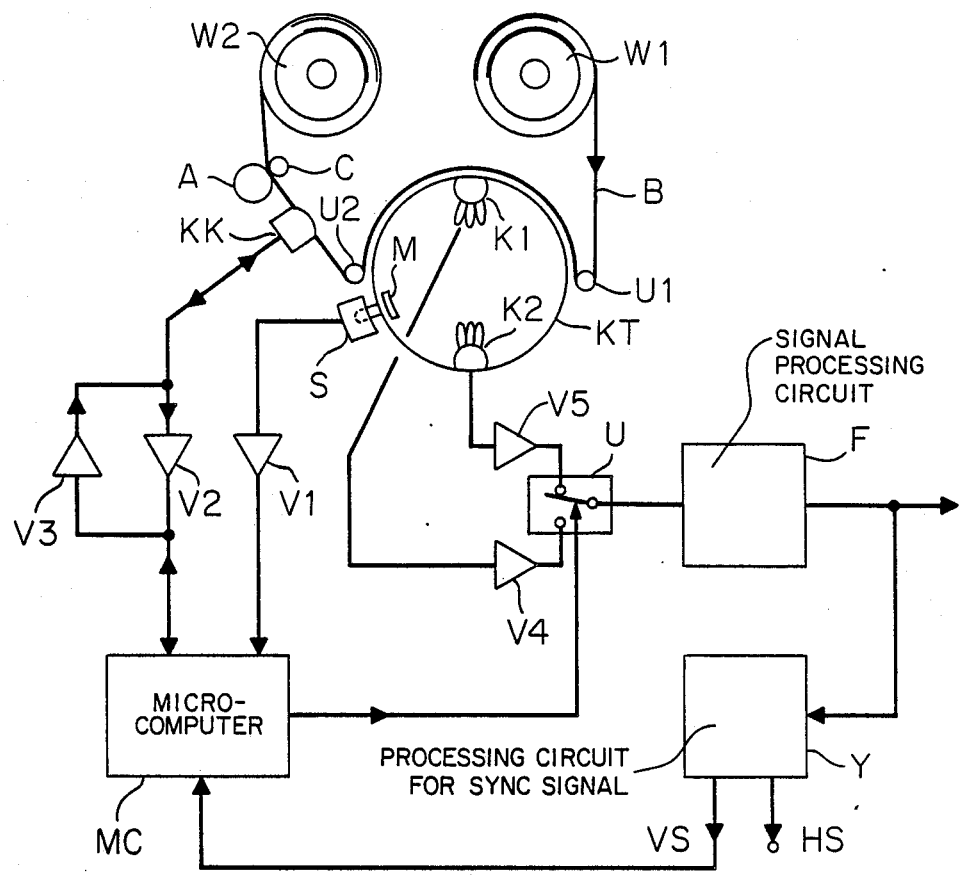

United States Patent [19]

Kaaden et al.

[11] Patent Number: 4,914,531
[45] Date of Patent: Apr. 3, 1990

[54] VIDEORECORDER WITH ROTATING HEAD DRUM AND VIDEO HEADS

[75] Inventors: Jürgen Kaaden, Villingen-Schwenningen; Hermann Link, VS-Obereschach, both of Fed. Rep. of Germany

[73] Assignee: Deutsche Thomson-Brandt GmbH, VS-Villingen, Fed. Rep. of Germany

[21] Appl. No.: 304,890

[22] Filed: Jan. 30, 1989

Related U.S. Application Data

[63] Continuation of Ser. No. 84,988, Aug. 12, 1987, abandoned.

[30] Foreign Application Priority Data

Aug. 29, 1986 [DE] Fed. Rep. of Germany ....... 3629481

[51] Int. Cl.$^4$ ................... G11B 21/04; H04N 5/782
[52] U.S. Cl. ..................................... 360/64; 360/70
[58] Field of Search ............................. 360/64, 70

[56] References Cited

U.S. PATENT DOCUMENTS

| | | | |
|---|---|---|---|
| 3,358,080 | 12/1967 | MacLeod | 360/70 |
| 3,401,231 | 9/1968 | Baldwin | 360/64 |
| 3,463,877 | 8/1969 | Crum | 360/70 |
| 3,838,451 | 9/1974 | Mino | 360/64 |
| 3,883,890 | 5/1975 | Tanigawa et al. | 360/70 |
| 4,120,007 | 10/1978 | Sato | 360/64 |
| 4,343,022 | 8/1982 | Tanaka et al. | 360/64 |
| 4,361,856 | 11/1982 | Okamoto | 360/64 |
| 4,600,953 | 7/1986 | Furuhata et al. | 360/64 |
| 4,706,137 | 11/1987 | Tanaka | 360/70 |

*Primary Examiner*—Alan Faber
*Assistant Examiner*—David L. Robertson
*Attorney, Agent, or Firm*—Max Fogiel

[57] ABSTRACT

The invention concerns a videorecorder with a rotating head drum (KT) that has video heads (K1 & K2) with a magnetic tape (B) looped partly around them mounted on it, with at least one pulse generator (M) mounted on the head drum, with at least one sensor (S) that generates a head-shift signal that switches from one video head to the other, and with a control head (KK) for scanning the vertical-synchronization signal during playback. In the playback mode the time between the signal supplied to the sensor and the vertical-synchronization signal is measured and compared with a reference, and a criterion for controlling the position in time of the head-shift signal is derived from the comparison.

7 Claims, 2 Drawing Sheets

VIDEORECORDER WITH ROTATING HEAD DRUM AND VIDEO HEADS

The invention concerns a videorecorder with a rotating head drum that has video heads with a magnetic tape looped partly around them mounted on it, with at least one pulse generator mounted on the head drum, with at least one sensor that generates a head-shift signal that switches from one video head to the other, and with a control head for scanning the vertical-synchronization signal during playback.

The basic principles of video technology are explained by Friedrich Manz in *Videorecorder-Technik*, Vogel, 1979.

In professional recorders the video signals are recorded in transverse tracks on the magnetic tape in the transverse-track recording system, whereas home recorders employ the helical-track recording system, with the signals recorded in helical tracks on the tape. The audio, however, is recorded in longitudinal tracks.

The magnetic tape is partly looped around a rotating head drum, which has two video heads mounted on it in the known video systems—VHS, VCR (Phillips Video Cassette System), and Betamax—as described on page 104 and illustrated in FIG. 5.6 on page 105 of the reference previously cited herein.

In VCR's the tape is looped 180° around the head drum, so that there are no overlaps. Since, just before one video head engages the magnetic tape, the other leaves the 180° that the tape is looped around, only one head is ever in contact with the tape at one time, and VCR's always have a gap between the signals from the two video heads. To eliminate this gap the tape employed in Betamax and VHS recorders always loops around more than 180°, creating an overlap that extends over 3 to 6 lines.

Certain problems occur in all three systems—VCR, VHS, and Betamax—during the shift from one video head to the other unless special measures are taken. With no overlap only the amplifier noise is active, whereas with overlap the superimposition of the signals deriving from both video heads increases the amplitude. The instant of shift from one video head to the other must be precisely established. The shift is initiated by a pulse that is subsequently called a head-shift pulse. The head-shift pulse must occur neither in the visible portion of the picture nor in the vertical-synchronization portion. In the first case the head-shift pulse would show up on the screen as a phase jump, and in the latter the picture would jitter due to malfunctions in the vertical-synchronization pulse. The head-shift pulse is accordingly always positioned in the invisible portion of the picture on the screen.

The standard for the VHS system prescribes positioning the head-shift pulse 6.5 lines and with a tolerance of ±1.5 lines in front of the vertical-synchronization pulse, which is detected by the control head of a separate control track that is recorded longitudinally. In contrast to the vertical-synchronization pulse, the head-shift pulse is not recorded on the tape but generated by a pulse generator on the head drum and by a sensor next to the head drum. The pulse generator can for example be a magnet on the head drum, and the sensor a coil, in which the magnet induces a voltage, from which the head-shift pulse is derived. Several pulse generators can be mounted on the head drum, and there can be several sensors.

Optical transmitters and receivers can also be employed instead of inductive pulse generators and sensors. The pulse generator and sensor must, like the control head, be precisely adjusted if the head-shift pulse is to be generated at the correct instant. That alone, however, is not sufficient because the speed at which the tape is traveling and the speed of rotation and instantaneous position of the head drum also help determine the instant of the vertical-synchronization signal and of the head-shift pulse. Thus, both the tape speed and the rate of rotation and position of the head drum are controlled by what are called servo control loops, which also ensure that the video heads precisely scan the helical tracks during playback. Precise scanning is necessary because the FBAS signal, the vertical-synchronization signal, and the horizontal-synchronization signal are recorded in the helical tracks with a very narrow track width—only 50 μm for example. The control head that picks up the control signals for the tape servo control loop, the sensor for the head-shift pulses, and the circuit downstream of the sensor that processes and forwards the head-shift pulses are adjusted by inserting what is called a test tape, which has standard video signals and vertical-synchronization signals recorded on it, into the videorecorder. Because the edges of the head-shift pulse supplied by the sensor are not steep enough and because their position in time is not precisely enough defined, the pulse is processed in the circuit downstream of the sensor, which yields a clean rectangular pulse. The position in time of the edges of the servo control loop is precisely adjusted by means of the test tape.

Pulse generators in the form of magnets unfortunately eventually lose field strength. Still, optical pulse generators and sensors also age, and the efficiency of a light diode or laser diode, meaning the ratio of emitted light to incoming electric power, gradually declines, as does the efficiency of a phototransistor or photodiode, meaning the ratio of emitted electric power to incoming light. The spectral sensitivity of optical transmitters and receivers also varies.

The aging on the part of the pulse generator, and of the sensor as well in optical systems, displaces the edges of the head-shift pulse sometimes so far out of its correct position that either the pulse appears on the screen in the form of a phase jump or the picture begins to jitter.

To restore unobjectionable playback, the circuit that processes the head-shift pulse downstream of the sensor must be retuned with the aforesaid test tape. This retuning is not only very expensive for the shop but is also inconvenient for the customer because it costs time and money.

The object of the present invention is accordingly to improve a videorecorder to the extent that retuning due to aging on the part of the pulse generator and sensor that generate the head-shift pulse will be unnecessary.

This object is attained in accordance with the invention in that in the playback mode the time between the signal supplied to the sensor and the vertical-synchronization signal is measured and compared with a reference, and a criterion for controlling the position in time of the head-shift signal is derived from the comparison.

Figure 2:
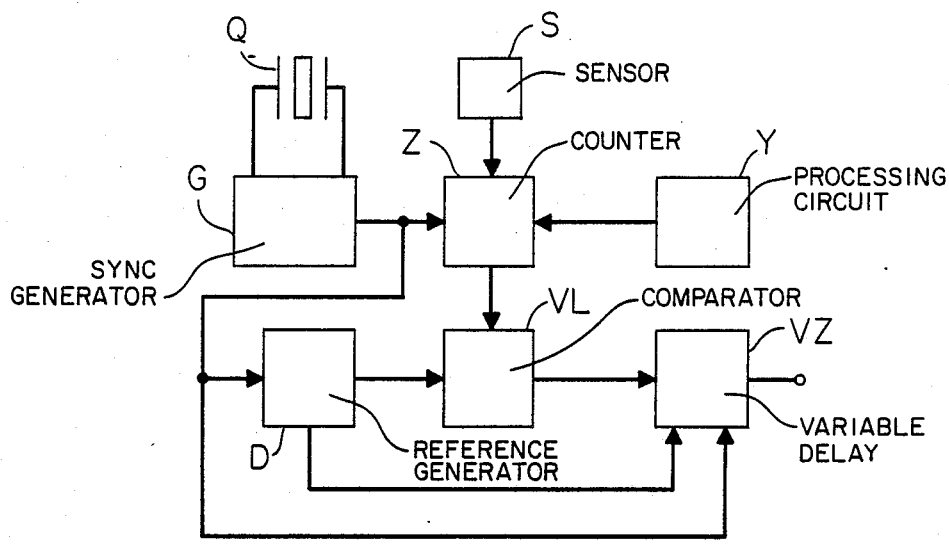
Figure 3:
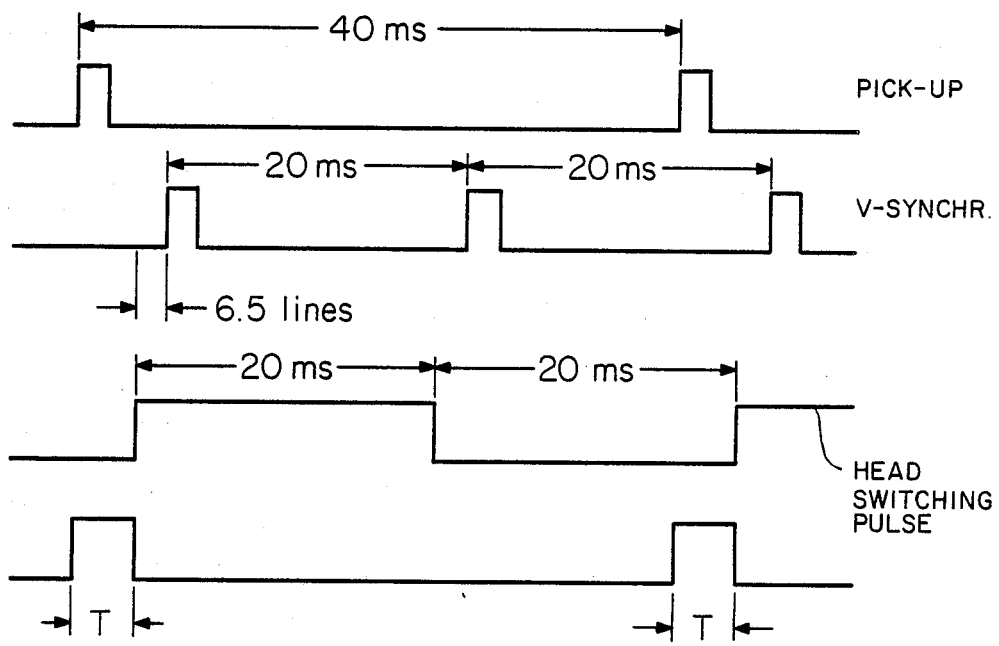

In the drawing,

FIG. 1 illustrates one embodiment of a videorecorder in accordance with the invention, FIG. 2 illustrates the circuitry recited in claim 2, and FIG. 3 is a pulse diagram that illustrates how the videorecorder in accordance with the invention operates.

FIG. 1 shows how a magnetic tape B leads from a supply reel W1 and around two deflection rollers U1 and U2 and a head drum KT, surrounding the latter to more than 180°. From deflection roller U2 the tape travels between a capstan C and a pressure-application roller A that holds it against the capstan to a take-up reel W2. Two diametrically opposed video heads K1 and K2 and a head-shift pulse generator M, which can for example be a magnet, are mounted on head drum KT. A sensor S in the form of a coil is positioned directly adjacent to head drum KT, creating a narrow magnetic coupling between it and magnet M. The voltage induced in coil S is supplied through an amplifier V1 to one input terminal of a microcomputer MC. The tape servo-control loop signals obtained from control head KK while the videorecorder is in playback are forwarded through another amplifier V2 to the other input terminal of microcomputer MC. While the videorecorder is recording, microcomputer MC releases the tape servo-control loop control signals that will be needed later during playback through an amplifier V3 to control head KK, which records them longitudinally on the separate control tracks. Microcomputer MC releases the head-shift signal through its output terminal, which is connected to the control input terminal of a variable switch U. Video head K1 is connected through an amplifier V4 to the input terminal of variable switch U, whereas head K2 is connected through an amplifier V5 with the other input terminal of variable switch U. The output terminal of variable switch U, which supplies the FBAS signal and the vertical- and horizontal-synchronization signals, is connected to the input terminal of a signal-processing circuit F, the output terminal of which is connected to the input terminal of a synchronization-signal processing circuit Y. The processed horizontal-synchronization signal HS occurs at one output terminal of circuit Y and the processed vertical-synchronization signal VS at its other output terminal, which is connected to the third input terminal of microcomputer MC. The head-shift signal at the output terminal of microcomputer MC activates variable switch U, switching from one video head to the other.

How the head-shift signal is supplied at the correct time to variable switch U in order to switch from one video head to the other at the correct time will now be described with reference to the circuit diagram in FIG. 2, which illustrates the section of microcomputer MC that generates the head-shift signal, and to the pulse diagram in FIG. 3.

The sensor in the form of a coil S in FIG. 2 is connected to the RESET input terminal of a counter Z. The STOP input terminal of counter Z is connected to the output terminal (designated VS) of synchronization-signal processing circuit Y and its synchronization input terminal to a synchronization generator G. The output terminal of counter Z is connected to one input terminal of a comparator VL. The other input terminal of comparator VL is connected to one output terminal of a reference generator D. The output terminal of comparator VL is connected to one input terminal of a variable delay stage VZ. The head-shift signal occurs at the output terminal of variable delay stage VZ in the form of a pulse, which will be called the head-shift pulse herein from now on. The second output terminal of reference generator D is connected to the second input terminal of variable delay stage VZ. The clock signal generated in synchronization generator G by a crystal Q is supplied to the synchronization input terminals of counter Z, reference generator D, and variable delay stage VZ.

For every voltage pulse induced per revolution in the sensor in the form of coil S by the pulse generator M on head drum KT, counter Z receives at its RESET input terminal a pulse called a pick-up pulse that resets it to zero. At every clock pulse on the part of synchronization generator G the state of counter Z will increase 1 value until it is stopped by the processed vertical-synchronization pulse at the STOP input terminal. This counter state, which corresponds to the time interval between the pick-up pulse and the processed vertical-synchronization pulse, is compared in comparator VL with the reference supplied by reference generator D to comparator VL. If the actual value does not equal the reference value, the next (subsequent) head-shift pulse is delayed in variable delay stage VZ by enough synchronization pulses to make the time interval between the head-shift pulse and the processed vertical-synchronization pulse equal the value that corresponds to the standard distance of 6.5 lines prescribed for VHS systems. If on the other hand the reference does equal the actual value, the head-shift pulse is emitted undelayed. The regulating range is of course asymmetrical in this case, and it is accordingly a good idea to position the pick-up pulse over time in such a way that the head-shift pulse will be delayed a specified number of synchronization pulses even when the actual value equals the reference, in order to make the regulating range symmetrical and eliminate the drawbacks typical of an asymmetrical range.

The diagram in FIG. 3 illustrates the pick-up pulses, which are 40 msec apart, the processed vertical-synchronization pulses, which are ideally 20 msec apart, and the head-shift pulse. Since, however, microcomputer MC processes only every other vertical-synchronization pulse, the interval between two consecutive vertical-synchronization pulses that are to be processed will be, as in the case of the pick-up pulses, 40 msec. The time T that variable delay stage VZ delays the head-shift pulse by is also illustrated symbolically. The head-shift pulse in the illustrated embodiment is 20 msec long and is followed by a pause of the same length. Since the time between the pick-up pulse and the processed vertical-synchronization pulse is measured and compared with the reference at every revolution of the head drum, the head-shift pulse will always appear at the correct instant. Thus, the gradual decrease in magnetic field strength that occurs with magnetic pulse generators and the constant decrease in efficiency that occurs with optical pulse generators and sensors due to age will no longer affect the position of the head-shift pulse. Regular readjustment of the videorecorder at the shop will no longer be necessary. Another advantage of the videorecorder in accordance with the invention is that it can also be employed to play tapes with vertical-synchronization pulses that exceed the prescribed tolerances to a certain extent.

In one development of the videorecorder in accordance with the invention the head-shift pulse is delayed by the same number of synchronization pulses as in recording when the processed vertical-synchronization signal is constantly absent.

In another development the delay in the head-shift pulse that precedes absences of the processed vertical-synchronization signal is, when the absences are only brief, maintained until the signal returns.

The overall system of synchronization (clock) generator G, counter Z, reference generator D, comparator VL, and variable delay stage VZ can very easily be incorporated into a microcomputer. The comparison of the actual and reference values in comparator VL can be employed to establish a criterion for regulating tape speed. The speed of the tape-advance motor and hence of the tape is regulated in this embodiment of the videorecorder in accordance with the invention such that the head-shift pulse will appear as prescribed, 6.5 lines upstream of the vertical-synchronization pulse. It is also possible to combine tape-speed regulation and head-shift pulse delay in order to generate the head-shift pulse at the correct instant.

Although the operation of the videorecorder in accordance with the invention has been specified with reference to a device that complies with the VHS standard, the invention is not restricted to VHS and may be employed with any system wherein the head-shift pulse must be generated a prescribed amount of time prior to the processed vertical-synchronization pulse.

What is claimed is:

1. A video recorder comprising: a rotating head drum with video heads for scanning a FBAS-signal, a horizontal-synchronization signal and a vertical-synchronization signal; a magnetic tape looped partly around said drum; pulse generator means mounted on said head drum; single sensor means generating a pick-up signal; a control head for scanning control signals on said tape for a control servoloop during playback; said sensor means being coupled with said pulse generator means; means for generating a processed vertical synchronization signal; means for measuring the time interval between said pick-up signal from said sensor means and the occurrence of said processed vertical synchronization signal and providing a measured output, said measuring means being connected to said sensor means and said means for generating said processed vertical synchronization signal, said measuring means receiving said pick-up signal from said sensor means; comparator means for comparing said measured output with a reference value and providing a comparison output; and means for generating a head-shift signal and controlling timing of said head-shift signal dependent on said comparison output; said means for generating said head-shift signal delaying said head-shift signal dependent on said comparison output, said head-shift signal switching from one video head to the other.

2. A video recorder comprising: a rotating head drum with video heads for scanning a FBAS-signal, a horizontal-synchronization signal and a vertical-synchronization signal; a magnetic tape looped partly around said drum; pulse generator means mounted on said head drum; single sensor means generating pick-up signal; a control head for scanning control signals on said tape for a control servoloop during playback; said sensor means being coupled with said pulse generator means; means for generating a processed vertical synchronization signal; means for measuring the time interval between said pick-up signal from said sensor means and the occurrence of said processed vertical synchronization signal and providing a measured output, said measuring means being connected to said sensor means and said means for generating said processed vertical synchronization signal; said measuring means receiving said pick-up signal from said sensor means; comparator means for comparing said measured output with a reference value and providing a comparison output; and means for generating a head-shift signal and controlling timing of said head-shift signal dependent on said comparison output; said means for generating said head-shift signal delaying said head-shift signal dependent on said comparison output, said head-shift signal switching from one video head to the other; said head-shift signal having a timing regulated as a function of a comparison to generate the head-shift signal at variable times subsequent to said pick-up signal from said sensor means but prior to said processed vertical-synchronization signal; said sensor means supplying said pick-up signal with timing arranged so that said head-shift signal is located precisely between said pick-up signal supplied by said sensor means and said proceed vertical-synchronization signal during playback of a standard recording on the tape; counter means with a RESET input terminal and a STOP input terminal, said sensor means supplying said pick-up signal to said RESET input terminal of said counter means, said processed vertical-synchronization signal being a pulse-shaped signal supplied to said STOP input terminal of said counter means; said comparator means having first and second input terminals, said counter means having an output terminal connected to said first input terminal of said comparator means; reference generator means having an output terminal connected to said second input terminal of said comparator means; said means for generating said head-shift signal comprising a variable delay stage with a control input terminal connected to an output terminal of said comparator means; said variable delay stage having an output terminal supplying said head-shift signal as a pulse-shaped head-shift signal; said counter means, said reference generator means, and said variable delay stage having clock signal input terminals; and clock signal generator means having an output terminal connected to said clock signal input terminals; said pulse-shaped head-shift signal having a position in time that is maintained when vertical-synchronization signals are absent during a predetermined interval; said pulse-shaped head-shift signal being generated at the same instant that a head-shift signal would be generated during recording when a vertical-synchronization signal is absent for a time interval exceeding a predetermined length.

3. A video recorder as defined in claim 1, wherein said head-shift signal has a timing regulated as a function of a comparison to generate the head-shift signal at variable times subsequent to said pick-up signal from said sensor means but prior to said processed vertical-synchronization signal.

4. A video recorder as defined in claim 3, wherein said sensor means supplies said pick-up signal with timing arranged so that said head-signal is located precisely between said pick-up signal supplied by said sensor means and said processed vertical-synchronization signal during playback of a standard recording on the tape.

5. A video recorder as defined in claim 3, including counter means with a RESET input terminal and a STOP input terminal, said sensor means supplying said pick-up signal to said RESET input terminal of said counter means, said processed vertical-synchronization signal being a pulse-shaped signal supplied to said STOP input terminal of said counter means; said comparator means having first and second input terminals, said counter means having an output terminal connected to said first input terminal of said comparator means; reference generator means having an output terminal connected to said second input terminal of said comparator means; said means for generating said head-shift signal comprising a variable delay stage with a control input terminal connected to an output terminal of said comparator means; said variable delay stage having an output terminal supplying said head-shift signal as a pulse-shaped head-shift signal; said counter means, said reference generator means, and said variable delay stage having clock signal input terminals; and clock signal generator means having an output terminal connected to said clock signal input terminals.

6. A video recorder as defined in claim 5, wherein said pulse-shaped head-shift signal has a position in time that is maintained when vertical-synchronization signals are absent during a predetermined interval.

7. A video recorder as defined in claim 6, wherein said pulse-shaped head-shift signal is generated at the same instant that a head-shift signal would be generated during recording, when a vertical-synchronization signal is absent for a time interval exceeding a predetermined length.

* * * * *